United States Patent
Kajitani

(10) Patent No.: US 7,070,159 B2
(45) Date of Patent: Jul. 4, 2006

(54) VACUUM REGULATING VALVE

(75) Inventor: Masao Kajitani, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/890,466

(22) Filed: Jul. 12, 2004

(65) Prior Publication Data

US 2005/0045839 A1    Mar. 3, 2005

(30) Foreign Application Priority Data

Sep. 2, 2003    (JP) ............................. 2003-310607

(51) Int. Cl.
*F16K 31/00* (2006.01)
(52) U.S. Cl. ....................... 251/14; 251/63.6; 251/285
(58) Field of Classification Search ......... 251/62–63.6, 251/218, 285, 14
See application file for complete search history.

(56) References Cited

U.S. PATENT DOCUMENTS 3,155,365 A * 11/1964 Hartung et al. .............. 251/25
4,461,450 A * 7/1984 Soland et al. .............. 251/63.5
5,848,608 A * 12/1998 Ishigaki ................. 137/599.16
6,814,338 B1 * 11/2004 Kajitani ..................... 251/63.6

FOREIGN PATENT DOCUMENTS

JP          08-178126         7/1996

* cited by examiner

*Primary Examiner*—Justine R. Yu
*Assistant Examiner*—Peter deVore
(74) *Attorney, Agent, or Firm*—Peter Ganjian

(57) ABSTRACT

A vacuum regulating valve includes a valve casing provided with two main ports, a passage connecting the two main ports, a valve seat formed in the passage, a valve element capable of being seated on the valve seat, a valve stem extending from the valve element, and a piston attached to the free end of the valve stem. A valve opening setting unit includes a valve opening setting shaft having a free end held in contact with the back surface of the piston, and a driving mechanism capable of continuously axially moving the valve opening setting shaft to a desired position to set the piston at an operating position corresponding to a desired valve opening.

3 Claims, 2 Drawing Sheets

VACUUM REGULATING VALVE

BACKGROUND OF THE INVENTION

1. Field of the Invention

The present invention relates to a vacuum regulating valve for regulating the pressure in an evacuated vacuum vessel for chemical reaction included in a physical or chemical machine or the like.

2. Description of the Related Art

A chemical process, such as an etching process, is carried out in a vacuum vessel included in a semiconductor device fabricating system. The vacuum vessel is evacuated at a negative pressure by a vacuum pump. A pressure regulating valve is placed in an external line connecting the vacuum vessel to the vacuum pump. A pressure regulating valve disclosed in JP-A No. 8-178126 has two ports connected, respectively, to a vacuum vessel and a vacuum pump, internal passage connecting the two ports, a valve seat formed in the internal passage, a valve element to be seated on the valve seat to close the pressure regulating valve, and a piston for operating the valve element. The stroke of the piston corresponds to a full valve opening of the pressure regulating valve.

Different vacuum vessels have different volumes and different vacuum pumps have different evacuating capacities, respectively. Therefore, it is desired to adjust the valve opening of the pressure regulating valve according to related conditions. Since the degree of vacuum in the vacuum vessel varies according to the rate of supply of reaction gases, a pressure change in the vacuum vessel must be compensated to maintain the interior of the vacuum vessel at a desired negative pressure. If the pressure regulating valve is always fully open and the valve opening is not regulated, discharge rate at which gases are discharged from the vacuum vessel cannot be regulated and, consequently, the pressure change cannot be accurately compensated.

SUMMARY OF THE INVENTION

Accordingly, it is an object of the present invention to provide a vacuum regulating valve capable of regulating its valve opening.

A vacuum regulating valve includes: a valve unit including a valve casing having an axis, provided with a first main port to be connected to a vacuum vessel, a second main port to be connected to a vacuum pump, an internal passage connecting the first and the second main port, a valve seat surrounding the first main port, a valve element placed in the valve casing and capable of being seated on the valve seat, a valve stem extending from the valve element backward along the axis of the valve casing, a partition wall attached to the back end of the valve casing, a return spring extended between the partition wall and the valve element to urging the valve element toward the valve seat so that the valve element may be seated on the valve seat; a cylinder actuator including a cylinder joined to a back end of the valve casing and provided with a pilot port, a piston axially slidably fitted in the cylinder so as to define a pressure chamber connected with the pilot port through which a pilot fluid is supplied into the pressure chamber, and connected to a back end of the valve stem; and a valve opening regulating unit for regulating operating position of the piston to regulate valve opening, including a valve opening setting shaft having one end in contact with a back surface of the piston, and a driving mechanism capable of continuously axially moving the valve opening setting shaft in either of opposite directions to a desired position to set the vacuum regulating valve for a desired valve opening by setting the piston at an operating position.

The piston is moved by supplying the pilot fluid into the pressure chamber of the cylinder actuator to open the vacuum regulating valve by separating the valve element from the valve seat. At the same time, the driving mechanism shifts the valve opening setting shaft to a proper position. The piston comes into contact with the valve opening setting shaft and the movement of the piston away from the valve seat is limited to stop the piston at a desired operating position. Thus, the valve opening is dependent on the position of the valve opening setting shaft. Valve opening can be continuously regulated by moving the valve opening setting shaft in either of opposite directions to a desired position.

Preferably, the driving mechanism includes: an electric motor having an output shaft capable of being rotated in opposite directions, and a motion converting mechanism capable of converting rotational motions of the output shaft of the electric motor into linear motions in opposite directions, and the valve opening setting shaft is connected to the motion converting mechanism.

Preferably, the motion converting mechanism includes a rotating screw rod connected to the output shaft of the electric motor, and an internally threaded nut mounted on the screw rod, restrained from turning and capable of moving axially along the screw rod, and the valve opening setting shaft has a base end connected to the nut, and a free end that can come into contact with and can separate from the piston.

Preferably, the valve opening regulating unit includes a sensor capable of measuring the displacement of the valve opening setting shaft, and the driving mechanism regulates the position of the valve opening setting shaft on the basis of a signal provided by the sensor.

Preferably, the cylinder actuator and the valve opening regulating unit are connected in series to an end part of the valve casing opposite the first main port, and the valve seat, the valve element, the valve stem, the piston and the valve opening setting shaft are arranged coaxially in alignment with the axis of the valve casing.

The valve element can be separated from the valve seat and valve opening can be accurately determined and regulated by the valve opening regulating unit including the valve opening setting shaft for determining the working position of the piston and the driving mechanism capable of continuously moving the valve opening setting shaft in either of the opposite directions for a necessary displacement.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
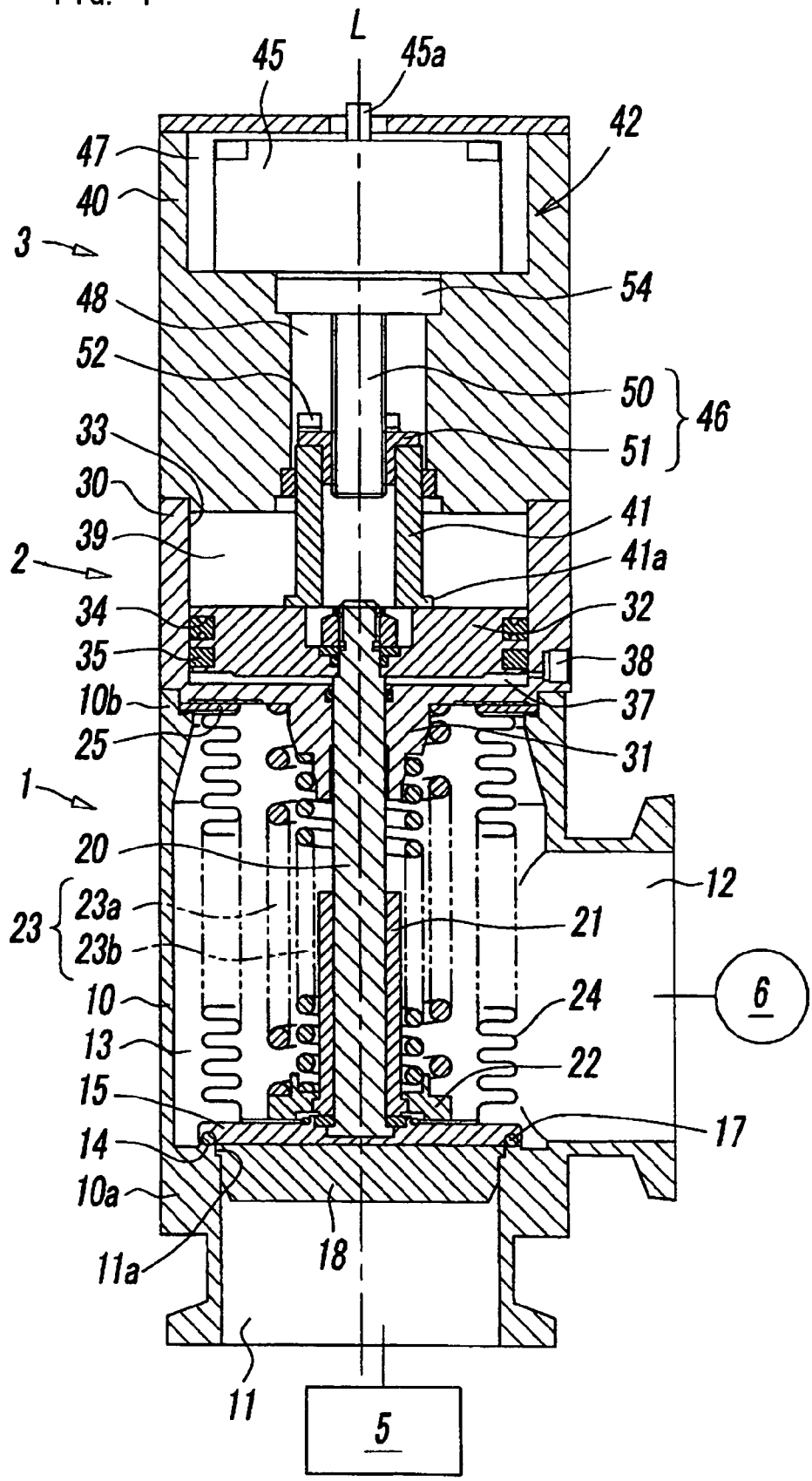
FIG. 1 is a longitudinal sectional view of a vacuum regulating valve in a preferred embodiment according to the present invention in a closed state.
Figure 2:
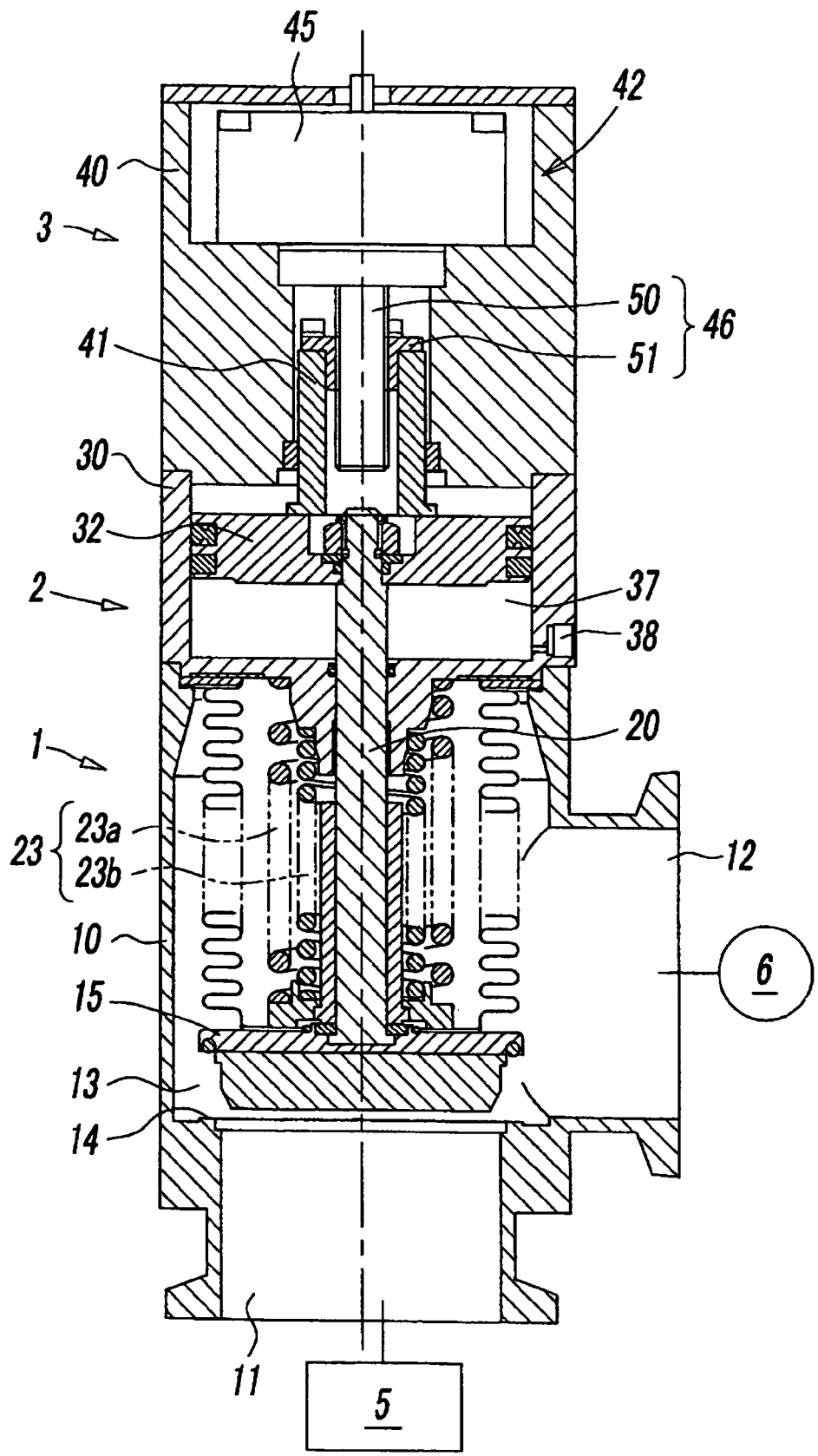
FIG. 2 is a longitudinal sectional view of the vacuum regulating valve shown in FIG. 1 in an open state.

Referring to FIGS. 1 and 2, a vacuum regulating valve in a preferred embodiment according to the present invention consists of a valve unit 1 provided with a valve element 15 for opening and closing a passage 13, a cylinder actuator 2 for operating the valve element 15 to open and close the passage 13, and a valve opening regulating unit 3 for setting the valve element 15 at a desired valve position. The valve unit 1, the cylinder actuator 2 and the valve opening regulating unit 3 are arranged and joined in series along the axis L of the vacuum regulating valve.

The valve unit 1 has a hollow valve casing 10 of a shape substantially resembling a circular cylinder or a prism. The valve casing 10 is provided with a first main port 11 to be connected to a vacuum vessel 5, and a second main port 12 to be connected to a vacuum pump 6. The first main port 11 is formed in an end wall 10a of the valve casing 10 coaxially with the axis L. The second main port 12 is formed in a side wall of the valve casing 10 with its axis extended perpendicularly to the valve axis L of the vacuum regulating valve. The passage 13 extends between the main ports 11 and 12. A valve seat 14 is formed in the end wall 10a so as to surround the inner end 11a of the first main port 11.

The poppet type valve element 15 to be seated on the valve seat 14 is disposed coaxially with the valve seat 14 in the valve casing 10. The valve element 15 has the shape of a disk. An annular groove is formed in a peripheral part of the front surface of the valve element 15, and a rubber sealing ring 17 is fitted in the annular groove of the valve element 15. A tapered, round, flow-regulating nose 18 is attached to the front surface of the valve element 15 so as to be surrounded by the sealing ring 17. The flow-regulating nose 18 is designed such that valve opening increases gradually as the distance between the valve seat 14 and the valve element 15 increases after the valve element 15 is separated from the valve seat 14. Thus, the flow regulating nose 18 limits the flow rate of a fluid at the initial stage of opening of the vacuum regulating valve. The flow-regulating nose 18 is not necessarily indispensable.

A partition wall 31 is held between the valve casing 10 of the valve unit 1 and the cylinder actuator 2. A valve stem 20 has a base end attached to a central part of the back surface of the valve element 15. The valve stem 20 extends coaxially with the axis L in the valve casing 10. A free end part of the valve stem 20 penetrates the partition wall 31, protrudes into the cylinder actuator 2, and is connected to a piston 32.

A cylindrical sleeve 21 of a predetermined length is put on a front end part of the valve stem 20. The sleeve 21 determines a maximum displacement of the valve element 15 from a position where the valve element 15 is seated on the valve seat 14. When the valve element 15 is moved for the maximum displacement, the sleeve 21 comes into contact with a seat formed in the partition wall 31 to limit the axial movement of the valve element 15. A spring retainer 22 is put on the back surface of the valve element 15. A return spring 23 is extended between the spring retainer 22 and the partition wall 31 to urge the valve element 15 resiliently toward the valve seat 14. The return spring 23 is a compound compression coil spring consisting of a first spring 23a of a large diameter and a second spring 23b of a small diameter. A stretchable bellows 24 is disposed in the valve casing 10 so as to enclose the valve stem 20, the sleeve 21 and the return spring 23. The bellows 24 has a front end attached to the back surface of the valve element 15 and a back end attached to a support plate 25 held between the back end of the valve casing 10 and the partition wall 31. The bellows 24 is formed of a corrosion resistant metal. The bellows 24 contracts as the valve element 15 is moved away from the valve seat 14 and stretches as the valve element 15 is moved toward the valve seat 14. The interior space of the bellows 24 connects with the atmosphere by means of a hole, not shown.

The cylinder actuator 2 has a cylinder 30 coaxially joined to the back end 10b of the valve casing 10. The cylinder 30 has a shape similar to that of the valve casing 10 substantially resembling a circular cylinder or a prism, and defines a cylinder bore 33. The piston 32 is fitted slidably in the cylinder bore 33 of the cylinder 30. A sealing ring 34 and a wear ring 35 are fitted in annular grooves formed in the side wall of the piston 32. The valve stem 20 penetrates the partition wall 31 axially slidably and the free end part of the valve stem 20 is connected to the piston 32.

A pressure chamber 37 is defined between the front surface of the piston 32 and the partition wall 31. The pressure chamber 37 connects with a pilot port 38 formed in the cylinder 30. The back surface of the piston 32 is exposed to a breather chamber 39 opening into the atmosphere. When a pilot fluid of a necessary pressure, such as compressed air, is supplied through the pilot port 38 into the pressure chamber 37 in a state where the vacuum regulating valve is closed as shown in FIG. 1, the piston 32 is moved backward, i.e., upward as viewed in FIG. 1. Consequently, the valve element 15 is separated from the valve seat 14 to open the first main port 11. When the pilot fluid is discharged from the pressure chamber 37 in a state where the vacuum regulating valve is open as shown in FIG. 2, the piston 32 and the valve stem 20 are advanced by the resilience of the return spring 23, and the valve element 15 is seated on the valve seat 14 to close the first main port 11.

The valve opening regulating unit 3 includes a tubular valve opening setting shaft 41 having a front end in contact with the back surface of the piston 32, and a driving mechanism 42 capable of continuously moving the valve opening setting shaft 41 for axial movement to a desired position, and a casing 40 having a shape similar to that of the cylinder 30 substantially resembling a circular cylinder or a prism and containing the valve opening setting shaft 41 and the driving mechanism 42. The driving mechanism 42 moves the valve opening setting shaft 41 to a desired position to determine an operating position for the piston 32 corresponding to a desired valve opening, namely, a desired gap between the valve element 15 and the valve seat 14.

The driving mechanism 42 includes an electric reversible motor 45, and a motion converting mechanism 46 capable of converting the rotational motions of the output shaft 45a of the reversible motor 45 into linear motions in opposite directions. The reversible motor 45 is placed in a motor chamber 47 formed in a back part of the casing 40. The motion converting mechanism 46 is placed in a space 48 extending between the motor chamber 47 and the breather chamber 39 of the cylinder actuator 2.

The motion converting mechanism 46 includes a rotating screw rod 50 connected to the output shaft 45a of the reversible motor 45, and an internally threaded nut 51 mounted on the screw rod 50, restrained from turning and capable of moving axially along the screw rod 50. The valve opening setting shaft 41 extends into the breather chamber 39, has a back end fastened to the nut 51 with screws 52, and a front end 41a that can come into contact with and can separate from the piston 32. The valve opening setting shaft 41, the screw rod 50 and the nut 51 of the motion converting mechanism 46, the piston 32, the valve stem 20, the valve element 15 and the valve seat 14 are arranged coaxially in alignment with the axis L. Although the axis of the first main port 11 is aligned with the axis L, the first main port 11 does not need necessarily to be on the axis L.

When the output shaft 45a of the reversible motor 45 is rotated in the normal or the reverse direction, the motion converting mechanism 46 converts the rotational motion of the output shaft 45a into a linear motion in one of opposite directions to move the valve opening setting shaft 41 backward or forward for a distance corresponding to an angular through which the output shaft 45a of the reversible motor 45 is rotated. The output shaft 45a of the reversible motor 45 is rotated through a desired angle in the normal direction to set the valve opening setting shaft 41 at a desired axial position. The piston 32 is moved backward as far as the piston 32 comes into contact with the valve opening setting shaft 41 to open the first main port 11. The backward movement of the piston 32 is limited by the valve opening setting shaft 41. Thus the valve opening of the vacuum regulating valve can be continuously changed by continuously axially moving the valve opening setting shaft 41 by the reversible motor 45 to set the vacuum regulating valve for a desired valve opening.

The valve opening regulating unit 3 includes a sensor 54 capable of measuring the displacement of the valve opening setting shaft 41. The sensor 54 is a rotary encoder combined with the reversible motor 45. The rotary encoder measures an angular displacement of the output shaft 45a of the reversible motor 45 to measure an axial displacement of the valve opening setting shaft 41 indirectly. A controller, not shown, controls the reversible motor 45 on the basis of a signal provided by the sensor 54 to move the valve opening setting shaft 41 continuously to a desired position. The sensor 54 may be such as capable of directly determining the position of the valve opening setting shaft 41. For example, the sensor 54 may be a magnetic sensor capable of detecting magnetic graduations marked on the valve opening setting shaft 41 or an optical sensor capable of detecting optical graduations marked on the valve opening setting shaft 41.

When the first main port 11 surrounded by the valve seat 14 needs to be opened and the vacuum pump 6 needs to be operated to evacuate the vacuum vessel 5, the valve element 15 is separated from the valve seat 14 by supplying the pilot fluid through the pilot port 38 into the pressure chamber 37 of the cylinder actuator 2 to move the piston 32 backward. At the same time, the reversible motor 45 is driven to position the valve opening setting shaft 41 at a predetermined position. The piston 32 comes into contact with the valve opening setting shaft 41 and is stopped at a position determined by the valve opening setting shaft 41. Thus the valve element 15 can be separated from the valve seat 14 by a distance determined by the position of the valve opening setting shaft 41.

If the negative pressure in the vacuum vessel 5 has changed due to the supply of reaction gases into the vacuum vessel 5, a change in the negative pressure needs to be compensated to maintain the interior of the vacuum vessel 5 at a desired negative pressure. In such a case, the position of the valve element 15 is adjusted to regulate the valve opening such that the gases are discharged at an optimum discharge rate and the change in the negative pressure is compensated. The negative pressure in the vacuum vessel 5 is measured by the vacuum sensor, the valve opening setting shaft 41 is advanced or retracted for a necessary distance by rotating the output shaft 45a of the reversible motor 45 in either the normal or the reverse direction according to a signal provided by the vacuum sensor to adjust the valve opening to a necessary valve opening.

When the valve opening needs to be increased, the valve opening setting shaft 41 is retracted to permit the piston 32 to be shifted further backward by the pilot fluid supplied into the pressure chamber 37. When the valve opening needs to be decreased, the valve opening setting shaft 41 is advanced to shift the piston 32 further forward. In decreasing the valve opening, the pressure to be applied to the piston 32 by the valve opening setting shaft 41 can be reduced or the moving speed of the piston 32 can be increased by regulating the pressure of the pilot fluid in the pressure chamber 37.

The pilot fluid is discharged from the pressure chamber 37 and the valve element 15 is advanced together with the piston 32 and the valve stem 20 by the resilience of the return spring 23 to seat the valve element 15 on the valve seat 14 when the vacuum vessel 5 evacuated at a predetermined negative pressure needs to be sealed or the vacuum regulating valve needs to be closed in an emergency.

Since the vacuum regulating valve is provided with the valve opening regulating unit 3 including the valve opening setting shaft 41 for determining the operating position of the piston 32, and the driving mechanism 42 capable of continuously moving the valve opening setting shaft 41 in a desired direction for a necessary distance, the vacuum regulating valve can be simply and accurately set for a necessary valve opening.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A vacuum regulating valve comprising:
   a valve unit including a valve casing having an axis, provided with a first main port to be connected to a vacuum vessel, a second main port to be connected to a vacuum pump, an internal passage connecting the first and the second main port, a valve seat surrounding the first main port, a valve element placed in the valve casing and capable of being seated on the valve seat, a valve stem extending from the valve element backward along the axis of the valve casing, a partition wall attached to the back end of the valve casing, a return spring extended between the partition wall and the valve element to urging the valve element toward the valve seat so that the valve element may be seated on the valve seat;
   a cylinder actuator including a cylinder joined to a back end of the valve casing and provided with a pilot port, a piston axially slidably fitted in the cylinder so as to define a pressure chamber connected with the pilot port through which a pilot fluid is supplied into the pressure chamber, and connected to a back end of the valve stem; and
   a valve opening regulating unit for regulating operating position of the piston to regulate valve opening, including a valve opening setting shaft having one end in contact with a back surface of the piston, and a driving mechanism capable of continuously axially moving the valve opening setting shaft in either of opposite directions to a desired position to set the vacuum regulating valve for a desired valve opening by setting the piston at an operating position,
   wherein the driving mechanism includes an electric motor having an output shaft capable of being rotated in opposite directions, and a motion converting mechanism capable of converting rotational motions of the output shaft of the electric motor into linear motions in opposite directions, and the valve opening setting shaft is connected to the motion converting mechanism, and
   the motion converting mechanism includes a rotating screw rod connected to the output shaft of the electric motor, and an internally threaded nut mounted on the screw rod, restrained from turning and capable of moving axially along the screw rod, and the valve opening setting shaft has a base end connected to the nut, and a free end that can come into contact with and can separate from the piston.

2. The vacuum regulating valve according to claim 1, wherein the valve opening regulating unit includes a sensor capable of measuring a displacement of the valve opening setting shaft, and the driving mechanism regulates the position of the valve opening setting shaft on the basis of a signal provided by the sensor.

3. The vacuum regulating valve according to claim 1, wherein the cylinder actuator and the valve opening regulating unit are connected in series to an end part of the valve casing opposite the first main port, and the valve seat, the valve element, the valve stem, the piston and the valve opening setting shaft are arranged coaxially in alignment with the axis of the valve casing.

* * * * *